(12) United States Patent
Smiljanic et al.

(10) Patent No.: US 9,122,794 B2
(45) Date of Patent: Sep. 1, 2015

(54) SYSTEM AND METHOD FOR DEBUGGING DOMAIN SPECIFIC LANGUAGES

(71) Applicant: Oracle International Corporation, Redwood Shores, CA (US)

(72) Inventors: John Smiljanic, Austin, TX (US); Shailesh Vinayaka, Los Gatos, CA (US); James Driscoll, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/664,106

(22) Filed: Oct. 30, 2012

(65) Prior Publication Data

US 2014/0123116 A1 May 1, 2014

(51) Int. Cl.
*G06F 9/44* (2006.01)
*G06F 11/36* (2006.01)

(52) U.S. Cl.
CPC ........ *G06F 11/3624* (2013.01); *G06F 11/3664* (2013.01)

(58) Field of Classification Search
USPC ........................................................ 717/130
See application file for complete search history.

(56) References Cited

U.S. PATENT DOCUMENTS

| 5,121,498 A | 6/1992 | Gilbert et al. |
| 5,339,428 A | 8/1994 | Burmeister et al. |
| 6,148,402 A | 11/2000 | Campbell |
| 6,282,702 B1 | 8/2001 | Ungar |
| 6,516,416 B2 | 2/2003 | Gregg et al. |
| 6,681,384 B1 | 1/2004 | Bates et al. |
| 6,915,509 B1 | 7/2005 | Chkodrov et al. |
| 6,966,057 B2 * | 11/2005 | Lueh ............................ 717/158 |
| 7,020,852 B2 | 3/2006 | Oeltjen et al. |
| 7,171,693 B2 | 1/2007 | Tucker et al. |
| 7,191,433 B2 | 3/2007 | Narad et al. |
| 7,225,429 B2 | 5/2007 | Bates et al. |
| 7,287,243 B2 | 10/2007 | Dollin et al. |
| 7,290,288 B2 | 10/2007 | Gregg et al. |

(Continued)

FOREIGN PATENT DOCUMENTS

WO 2014070902 5/2014

OTHER PUBLICATIONS

International Search Report and Written Opinion mailed on Jan. 13, 3014 for PCT Patent Application No. PCT/US2013/067523, 10 pages.

(Continued)

*Primary Examiner* — Hang Pan
(74) *Attorney, Agent, or Firm* — Kilpatrick Townsend & Stockton LLP

(57) ABSTRACT

Systems and methods for debugging domain specific languages are provided. In accordance with an embodiment, one such system can comprise a web which includes a virtual machine, a debug execution machine, and a domain specific language (DSL)-specific tool interface. The web server is configured to compile DSL code received from a developer computer. During compilation the DSL code is instrumented to include debugging information received from the developer computer. The web server is also configured to execute, by the virtual machine, the instrumented code. During execution the instrumented code communicates with the debug execution machine such that a state of the debug execution machine mirrors a state of the virtual machine.

21 Claims, 5 Drawing Sheets

(56) References Cited

U.S. PATENT DOCUMENTS

| | | | |
|---|---|---|---|
| 7,343,588 | B2 | 3/2008 | Bates et al. |
| 7,577,942 | B2 | 8/2009 | Bates et al. |
| 7,624,385 | B2 | 11/2009 | Waddington et al. |
| 7,685,570 | B2 | 3/2010 | Draine et al. |
| 7,774,172 | B1 | 8/2010 | Yunt et al. |
| 7,873,872 | B1 | 1/2011 | Shillington et al. |
| 7,917,894 | B2 | 3/2011 | Chen et al. |
| 7,945,958 | B2 | 5/2011 | Amarasinghe et al. |
| 8,104,021 | B2 | 1/2012 | Erlingsson et al. |
| 8,250,548 | B2 | 8/2012 | Kasahara et al. |
| 8,255,887 | B2 | 8/2012 | Heil |
| 8,332,828 | B2 | 12/2012 | Vargas |
| 8,392,885 | B2 | 3/2013 | Stall et al. |
| 8,418,135 | B2 | 4/2013 | Proctor |
| 8,601,453 | B2 | 12/2013 | Gennard |
| 8,627,303 | B2 | 1/2014 | Adams et al. |
| 8,677,141 | B2 | 3/2014 | Erlingsson et al. |
| 8,843,901 | B2 | 9/2014 | Krajec et al. |
| 8,863,085 | B1 | 10/2014 | Stahlberg |
| 8,869,121 | B2 | 10/2014 | Vorbach et al. |
| 8,887,138 | B2 | 11/2014 | Eker et al. |
| 2002/0129337 | A1* | 9/2002 | Evans et al. ............ 717/124 |
| 2007/0055957 | A1 | 3/2007 | Birenheide et al. |
| 2007/0113218 | A1 | 5/2007 | Nolan et al. |
| 2008/0127113 | A1 | 5/2008 | Wu et al. |
| 2009/0193497 | A1 | 7/2009 | Kikuchi et al. |
| 2009/0222792 | A1 | 9/2009 | Shanbhogue et al. |
| 2011/0173597 | A1 | 7/2011 | Cascaval et al. |
| 2011/0239307 | A1 | 9/2011 | Joffray et al. |
| 2011/0283266 | A1 | 11/2011 | Gallagher et al. |
| 2011/0313981 | A1 | 12/2011 | Ben-Natan |
| 2012/0151452 | A1 | 6/2012 | Zinkovsky et al. |
| 2012/0331351 | A1* | 12/2012 | Davis et al. ............ 714/38.1 |
| 2013/0067441 | A1 | 3/2013 | Lafreniere et al. |
| 2013/0086424 | A1 | 4/2013 | Smiljanic et al. |
| 2013/0086625 | A1 | 4/2013 | Driscoll et al. |
| 2013/0104103 | A1* | 4/2013 | Thunemann et al. ....... 717/115 |

OTHER PUBLICATIONS

Kolomvatsos, Kostas et al.; "Debugging Applications Created by a Domain Specific Language: The IPAC Case," *The Journal of Systems and Software*; 2012; vol. 85; pp. 932-943.

Camilo, Juan et al.; "Remove Debugging an EJB on WebLogic Server 10.0.1 with JDevelper 10.1.3.3;"; Jul. 2008; located at http://www.oracle.com/technetwork/developer-tools/jdev/remotededeugwls-086628.html; 6 pages.

Anonymous; "php—Remote Web Server Compilation?"; Mar. 25, 2012; located at http://stackoverflow.com/questions/9859072/remote-web-server-compilation; 1 page.

U.S. Appl. No. 13/328,728, Non-Final Office Action mailed on Jul. 16, 2014, 19 pages.

Champeau, Customizing Groovy compilation process, Cedric Champeau's Weblog, retrieved from: http://jroller.com/melix/entry/customizing_groovy_compilation_process, May 12, 2011, 5 pages.

MacDonald, Groovy AST Transform to inject Spring Security Check for Java Caller, www.ohnoes-nz.blogspot.com, retrieved from: <http://ohnoes-nz.blogspot.com/2011 /09/this-post-follows-on-withtrend-of. html>, Sep. 12, 2011, 2 pages.

MacDonald , "Groovy Logging Injection—AST Transformation", www.ohnoesnz.blogspot.com, retrieved from: <http:/ /ohnoes-nz.blogspot.com/20 11 /09/groovy-logging-injection-ast. html>, Sep. 16, 2011, 2 pages.

International Application No. PCT/US2014/048100, International Search Report and Written Opinion mailed on Oct. 8, 2014, 9 pages.

U.S. Appl. No. 13/328,728, Final Office Action mailed on Dec. 17, 2014, 22 pages.

U.S. Appl. No. 13/593,098, Non-Final Office Action mailed on Dec. 22, 2014, 16 pages.

U.S. Appl. No. 14/267,361, Non-Final Office Action mailed on Jan. 20, 2015, 11 pages.

Alex et al., Spring Security 3.0.8.Release Reference Documentation, <http://docs.spring.io/spring-security/site/docs/3.0.x/reference/springsecuritysingle.html>[Retrieved on: Dec. 9, 2014], Mar. 15, 2004, 136 pages.

Unknown, Oracle Fusion Middleware, Fusion Developer's Guide Application Development Framework, retrieved from: http://docs.oracle.com/cd/E25178_01/web 1111/b31974.pdf, Nov. 1, 2011, 39 pages.

Liu et al., "A Petri Net-based Distribution Debugger," IEEE, pp. 639-646, 1990.

Mega et al., "Debugging Distributed Object Applications With the Eclipse Platform", ACM, pp. 42-46, 2004.

Liang et al., "Debugging ObjectOriented Programs with Behavior Views", ACM, pp. 133-142, 2005.

Al-Sharif et al., "An Agent-Oriented Source-Level Debugger on Top of a Monitoring Framework", IEEE, pp. 241-247, 2009.

Danghui et al., "Design of a Real-Time Bus Monitor and Debugger for Embedded Systems", IEEE, pp. 4665-4667, 2010.

Johnson et al., "Composable Multi-Level Debugging with Stackdb", ACM, pp. 213-225, 2014.

Notice of Allowance mailed May 28, 2015 in U.S. Appl. No. 14/267,361, 16 pages.

Notice of Allowance mailed Jun. 17, 2015 in U.S. Appl. No. 13/593,098, 9 pages.

International Preliminary Report on Patentability mailed May 14, 2015 in Int'l Patent Application No. PCT/US2013/067523, 8 pages.

\* cited by examiner

SYSTEM AND METHOD FOR DEBUGGING DOMAIN SPECIFIC LANGUAGES

BACKGROUND

Increasingly, business users are being given the ability to develop their own custom software through cloud computing systems. A typical business user, such as an accountant or manager, is not a software developer. Therefore, the resources provided to business users to perform software development are generally tailored to a particular problem or business domain. For example, the business user may utilize a domain specific language (DSL) which may include business-specific logic which is easier and more intuitive for the average business user to work with as compared to general purpose programming languages such as Java.

When a software developer is writing code, the developer can compile and execute the code in a debugging mode. The debugging mode allows the developer a window into how the code the developer has written is executing. When code is executed in a debugging mode, the developer can typically: view variable values during execution, set breakpoints at which execution of the code will halt until the developer triggers continued execution, and/or step through execution of the code on a line-by-line basis.

The use of DSLs for the specification of business logic in the cloud requires the creation of debuggers to support those languages. As cloud based development increases, the increase in the number of DSLs, and their debuggers, has also increased. Many of the functions of a modern debugger are common to all languages. For example, debuggers visualize control flow and support the inspection of machine variables. However, there is no universal, common architecture for the creation of debuggers. This causes an industry-wide duplication of effort in the creation of debuggers and a lack of compatibility between debuggers.

BRIEF SUMMARY

Systems and methods for debugging domain specific languages are provided. In accordance with an embodiment, one such system can comprise a web which includes a virtual machine, a debug execution machine, and a domain specific language (DSL)-specific tool interface. The web server is configured to compile DSL code received from a developer computer. During compilation the DSL code is instrumented to include debugging information received from the developer computer. The web server is also configured to execute, by the virtual machine, the instrumented code. During execution the instrumented code communicates with the debug execution machine such that a state of the debug execution machine mirrors a state of the virtual machine. Embodiments of the present invention are described herein as utilizing the Java Platform Debug Architecture (JPDA) as a universal, common architecture for the creation of debuggers for DSLs. Although reference is made herein to JPDA and the Java platform specifically, other debug architectures may be similarly utilized.

In accordance with an embodiment, the DSL-specific tool interface is implemented by the debug execution machine. The debug execution machine can act as an intermediary between the debug client and the virtual machine executing the code. Additionally, the debug execution machine can implement a listener, wherein the listener can receive debug requests from and send debug events to a debugging interface at the developer computer. The debugging information received from the developer computer can include one or more of an instruction to set a breakpoint, a request for a variable value and an instruction to continue execution.

In some embodiments, the web server receives the debugging information from a debugging client at the developer computer, wherein the debugging client sends the debugging information to the web server through a debugging interface. In accordance with an embodiment, the debugging interface can be the Java Debug Interface (JDI), and the debugging interface can communicate with the DSL-specific tool interface using Java Debug Wire Protocol (JDWP).

DETAILED DESCRIPTION

In the following description, for the purposes of explanation, specific details are set forth in order to provide a thorough understanding of embodiments of the invention. However, it will be apparent that the invention embodiments may be practiced without these specific details.

Business users are increasingly enabled to develop their own software, such as through web interfaces to development environments hosted in cloud computing environments. Because these business users are typically not software developers, software development is generally performed using domain specific languages (DSLs). DSLs provide specialized functionality specific to a particular problem or business domain. DSLs enable business users to program at a higher level, e.g., using functions and methods which are more user friendly and easier to learn, as opposed to general purpose programming languages such as Java or C#. For example, a DSL may include expressions that enable functions to be performed that are specific to accounting or insurance. DSLs can be developed using other languages or platforms, such as Groovy, which is a superset of Java and therefore provides all of the functions of a standard Java implementation along with DSL constructs. It should be understood that similar principles as detailed herein may be applied to other programming languages and non-business logic arrangements.

In addition to the proliferation of specialized DSLs, additional software development tools are needed to support business user software development, such as debuggers. Many functions of modern debuggers are common to all programming languages. For example, debuggers visualize control flow and support the inspection of machine variables. Creating a new debugger for each DSL is a costly and redundant exercise. Accordingly, a universal architecture for the creation of debuggers is needed.

In accordance with an embodiment, the Java Platform Debug Architecture (JPDA) can be customized to serve as such a universal debugger platform. Although embodiments of the present invention are discussed with reference to the JPDA, other debug architectures could also be utilized. By utilizing JPDA to create a universal debug architecture, existing JPDA tools can also be utilized with DSLs. JPDA provides the underlying architecture which enables a debugging client (also referred to herein as a debugger), for example at a developer's computer, to communicate with, monitor and control a program or process being executed on a virtual machine, for example on a web server.

Figure 1:
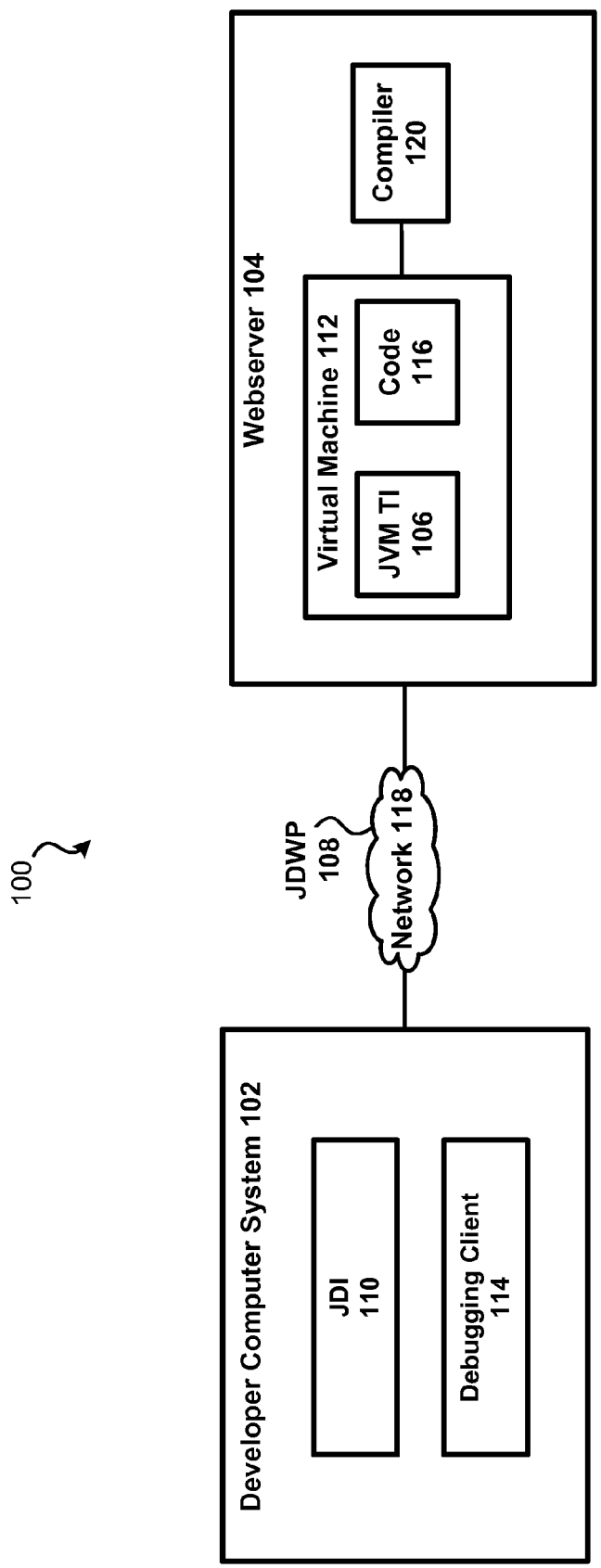
FIG. 1 shows a system for debugging Java code using JPDA.

FIG. 1 shows a system for debugging Java code using JPDA. As shown in FIG. 1, system 100 can include a developer computer system 102 and a webserver 104. JPDA enables a developer using developer computer system 102 to debug code executing at webserver 104. JPDA includes several layers: a Java Virtual Machine Tooling Interface (JVM TI) 106; a Java Debug Wire Protocol (JDWP) 108; and a Java Debug Interface (JDI) 110.

The JVM TI 106 is an interface implemented by a virtual machine 112 upon which an application being debugged executes. The JVM TI 106 defines the services the virtual machine 112 provides for debugging, such as requests for information (e.g., current stack frame), actions (e.g., set a breakpoint), and notifications (e.g., when a breakpoint has been reached during execution). In a typical Java debugger, the JVM TI defines the interface for interacting with the JVM. In a typical Java development environment, a Java virtual machine which is executing code being developed will implement the JVM TI, so that the JVM can receive and execute debug operations received from a developer system.

The Java Debug Interface (JDI) 110 is a Java interface implemented by the developer computer system 102 which defines information and requests at a user code level which a debugging client 114 can use to communicate with the virtual machine 112. The Java Debug Wire Protocol (JDWP) 108 defines the format of information and requests transferred between the program or process being debugged and the debugging client. The JDWP enables the code 116 being debugged and debugging client 114 to run under separate virtual machine implementations and/or on separate platforms.

In the system shown in FIG. 1, a developer can input a debugging instruction, e.g. set a breakpoint, using the debugging client 114. This instruction is communicated from the debugging client to JDI 110 which can then send the instruction across network 118 to webserver 104 using JDWP 108, where it is received by JVM TI 106. When code 116 is compiled by compiler 120, it can be instrumented with debugging information. As virtual machine 112 executes code 116, virtual machine 112 can check for breakpoints and when one is reached a notification can be returned to the developer. The notification can be sent from JVM TI 106 to JDI 110, using JDWP 108, and then presented to the developer through debugging client 114. Communication between the debug client and web server can continue similarly until debugging is complete.

Figure 2:
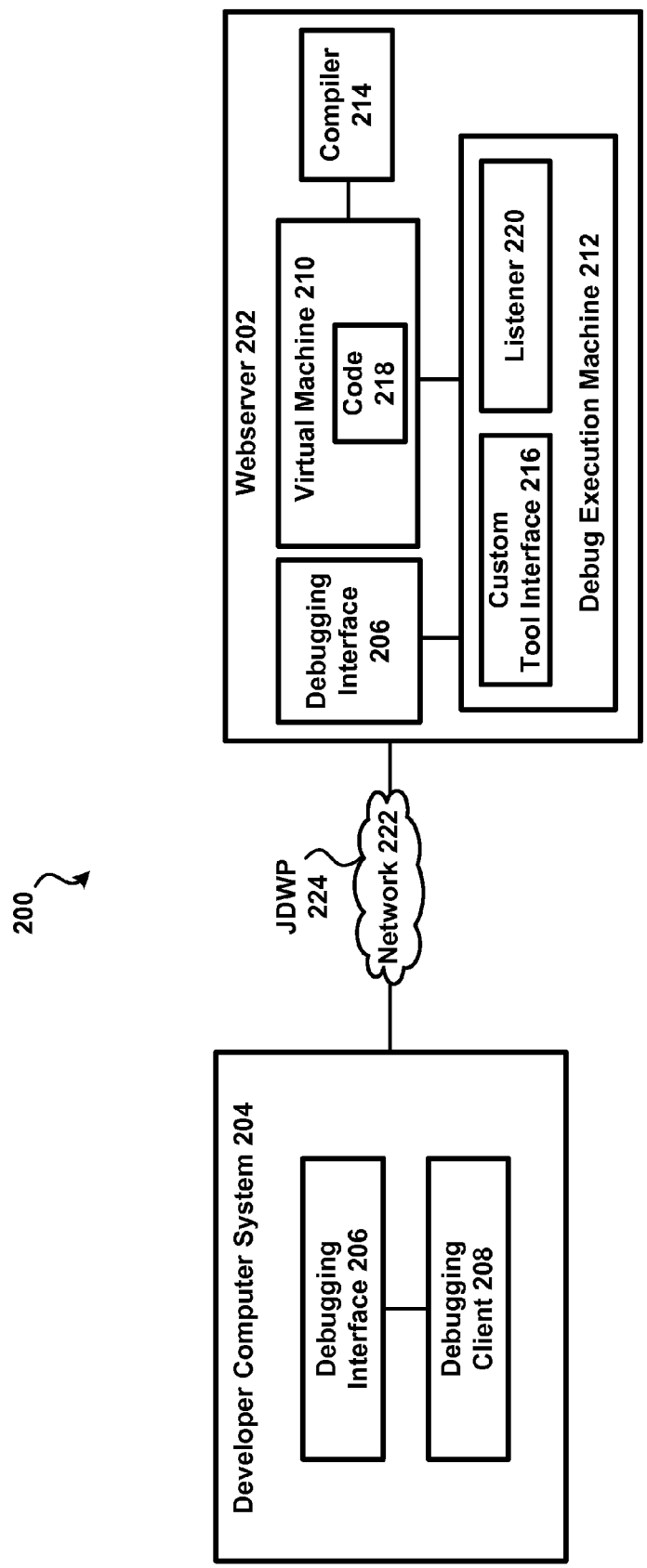
FIG. 2 shows a universal debug architecture for debugging code written in domain specific languages, in accordance with an embodiment of the present invention.

FIG. 2 shows a universal debug architecture for debugging code written in domain specific languages, in accordance with an embodiment of the present invention. System 200 can include a webserver 202 interacting with a developer computer system 204. In accordance with an embodiment, system 200 can be part of a larger system which includes a plurality of developer computer systems and a plurality of webservers, each serving one or more different developer computer systems. In accordance with an embodiment, developer computer system 204 can include debugging client 208. Additionally, webserver 202 can include virtual machine 210, debug execution machine 212 and compiler 214. The virtual machine 210 can execute the DSL code 218 under development, and the debug execution machine 212 can implement custom tool interface 216 and listener 220. Developer computer system 204 can communicate with webserver 202 via network 222. A debugging interface 206 can also be provided. In accordance with an embodiment, the debugging interface 206 can run on either the webserver 202 or the developer computer system 204.

As shown in FIG. 2, the DSL debug execution machine 212 implements JVM TI-like custom tool interface 216. In the example shown in FIG. 1, the virtual machine which is executing the code being debugged implements the TI and receives debug instructions directly from the developer. However, in the embodiment shown in FIG. 2, the debug execution machine 212 can serve as an intermediary between the developer and the virtual machine 210 executing the code. By implementing the custom tool interface 216, the debug execution machine can communicate with the debugging interface 206 and the separate execution machine, such as virtual machine 210, which is executing the DSL code 218.

In accordance with an embodiment, the universal debug architecture can use JDWP 224 as a protocol for communication between the debug client 208 and the debug execution machine 212. The DSL debugger can implement a JDWP listener 220. When the debug client 208 is started, it can establish a connection to the listener through debugging interface 206. The debug execution machine 212 can use that connection to receive debug requests and send debug events from/to debugging interface 206. The use of JDWP provides a formal, tested protocol for interaction, along with compatibility with between the execution machine and any other JPDA debug client. In accordance with an embodiment, a DSL debugger can use a standard JDI implementation as the debugging interface. This reduces the amount of work required to write a debug client.

When a DSL program, such as code 218, is compiled, the DSL instructions in the program can be instrumented with debugging information. For example, debugging information can include information about expression execution, or instructions to send state information, such as variable values to the debug execution machine 212. In accordance with an embodiment, the debug execution machine 212 is a state machine, and the instrumentation is responsible for initiating state transitions in the debug execution machine 212 as the code under development is executed by virtual machine 210. This way, the debug execution machine mirrors the state of the virtual machine which is executing the DSL program. Additionally, the virtual machine 210 can communicate with the debug execution machine 212 via the code instrumentation, notifying the debug execution machine 212 of expression evaluations and variable mutations. The debug execution machine 212 can check to see if a breakpoint has been requested for an expression and, if so, suspend execution of the virtual machine thread and notify the debugging interface 206 using JDWP. As such, the debug execution machine operates as an intermediary between the virtual machine which is executing the code, and the developer.

In accordance with an embodiment, the debug execution machine and the custom tool interface can be associated with one DSL. The custom tool interface can define services specific to that DSL. To provide support for a different DSL, a second debug execution machine and second custom tool interface can be implemented specific to the different DSL.

As described above, in accordance with an embodiment, the debugging client 208 can send debugging information to the webserver 202 through a debugging interface 206 over JDWP 224. In some embodiments, the debug interface may run on developer computer system 204 and communicate with webserver 202 over network 222 via JDWP 224. However, in some cloud-based development environments a JDWP port of the webserver 202 may not be opened. To accommodate these development environments, the debugging client 208 at the developer computer can send debugging information to an implementation of the debugging interface 206 running in webserver 202 over network 222 via a non-JDWP application protocol such as HTTP. The debugging interface implementation 206 at the webserver 202 can then communicate with the custom tool interface using a local JDWP connection.

Figure 3:
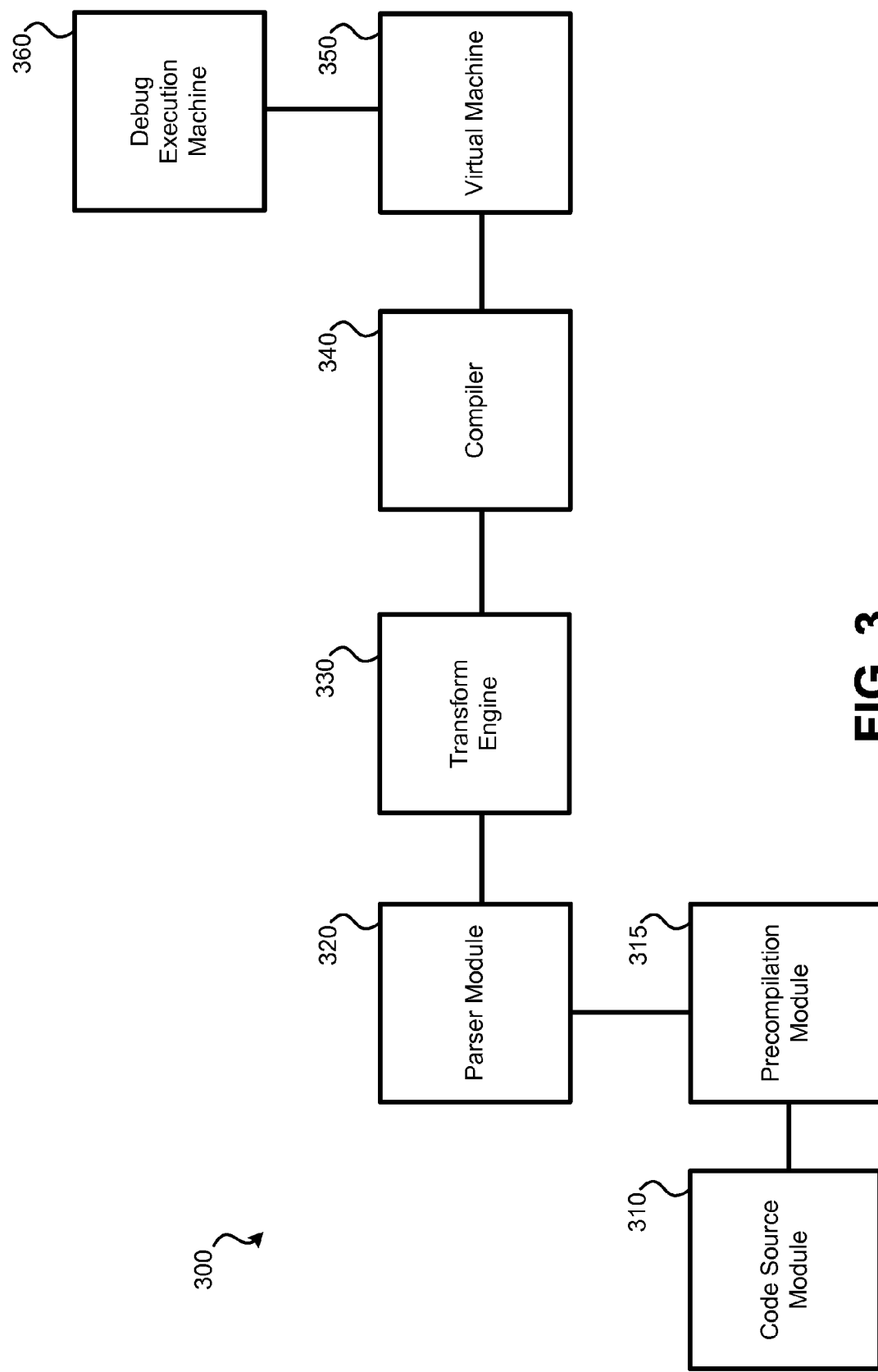
FIG. 3 illustrates an embodiment of a system configured for compiling DSL code which includes debugging functionality, in accordance with an embodiment of the present invention.

FIG. 3 illustrates an embodiment of a system 300 configured for compiling DSL code which includes debugging functionality. In accordance with an embodiment, each module shown in system 300, unless otherwise indicated, may be part of webserver 204. Accordingly, in at least some embodiments, system 300 may be understood as a part of system 200. System 300 comprises various modules, each of which may be implemented using software, firmware, and/or hardware. Components include: code source module 310, pre-compilation module 315, parser module 320, transform engine 330, compiler 340, virtual machine 350, and debug execution machine 360.

Code source module 310 may serve to receive DSL code. This code may be written in a syntax of a programming language that, when compiled, may be edited at the syntax tree level. For instance, GROOVY may be used as the programming language for the DSL code. In some embodiments, code source module 310 may be configured to receive DSL code from a remote computer system, such as code submitted via a web-based interface as presented in FIG. 2. Code source module 310 may serve to access a file which includes code that is to be compiled.

Pre-compilation module 315 may complete part of a compilation process of the DSL code received by code source module 310. In some embodiments, pre-compilation module 315 may insert one or more expressions in the DSL code received by code source module 310. Parser module 320 may parse the DSL code containing the expressions to create a syntax tree. The syntax tree may be an abstract syntax tree. At this juncture, it may be possible in some programming languages to modify the syntax tree prior to bytecode being compiled.

Transform engine 330 may modify the syntax tree created by parser module 320. transform engine 330 may add or modify some or all expressions of the expressions in the syntax tree. Whenever a variable value is modified, the syntax tree may be modified such that the variable value is output to debug execution machine 360. Accordingly, during execution, the debug execution machine 360 may maintain the current values of each variable present in the DSL code. A debugging client of a developer, such as debugging client 208 shown in FIG. 2, may request the value of a variable, which debug execution machine 360 may provide in response. Expressions may be added such that after each expression present in the DSL code is executed, execution is halted (e.g., placed in a suspended or loop mode) until an instruction is received from debug execution machine 360. Further, an indication of the expression executed or about to be executed may be provided to debug execution machine 360. In turn, debug execution machine 360 may provide an indication to the developer's debugging client of what expression has just been executed or is about to be executed. The debug execution machine 360 may wait for input from the developer via the debugging client before allowing virtual machine 350 to continue execution. If a developer has not indicated a breakpoint for a particular expression, debug execution machine 360 may allow execution of the DSL code to continue until an expression on which the developer has indicated a breakpoint is reached.

Depending on the DSL in use, compiler 340 may compile the modified syntax tree into a lower level executable code, such as bytecode. The DSL code received by code source module 310, as modified by pre-compilation module 315 and transform engine 330, may be compiled by compiler 340.

Virtual machine 350, which is in communication with debug execution machine 360, may execute the bytecode compiled by compiler 340. For each expression that was modified by transform engine 330, debug execution machine 360 may be consulted to determine whether execution should continue. Debug execution machine 360 may also receive values of variables, such as each time such a variable value may be modified from virtual machine 350. Debug execution machine 360 may also receive an indication of the current expression of DSL code executed or about to be executed. Such information may be received by debug execution machine 360. Input from a developer computer system may be requested by debug execution machine 360 before the bytecode is permitted to proceed and/or information may be output to the developer (such as variable values) via a debugging client by debug execution machine 360.

Figure 4:
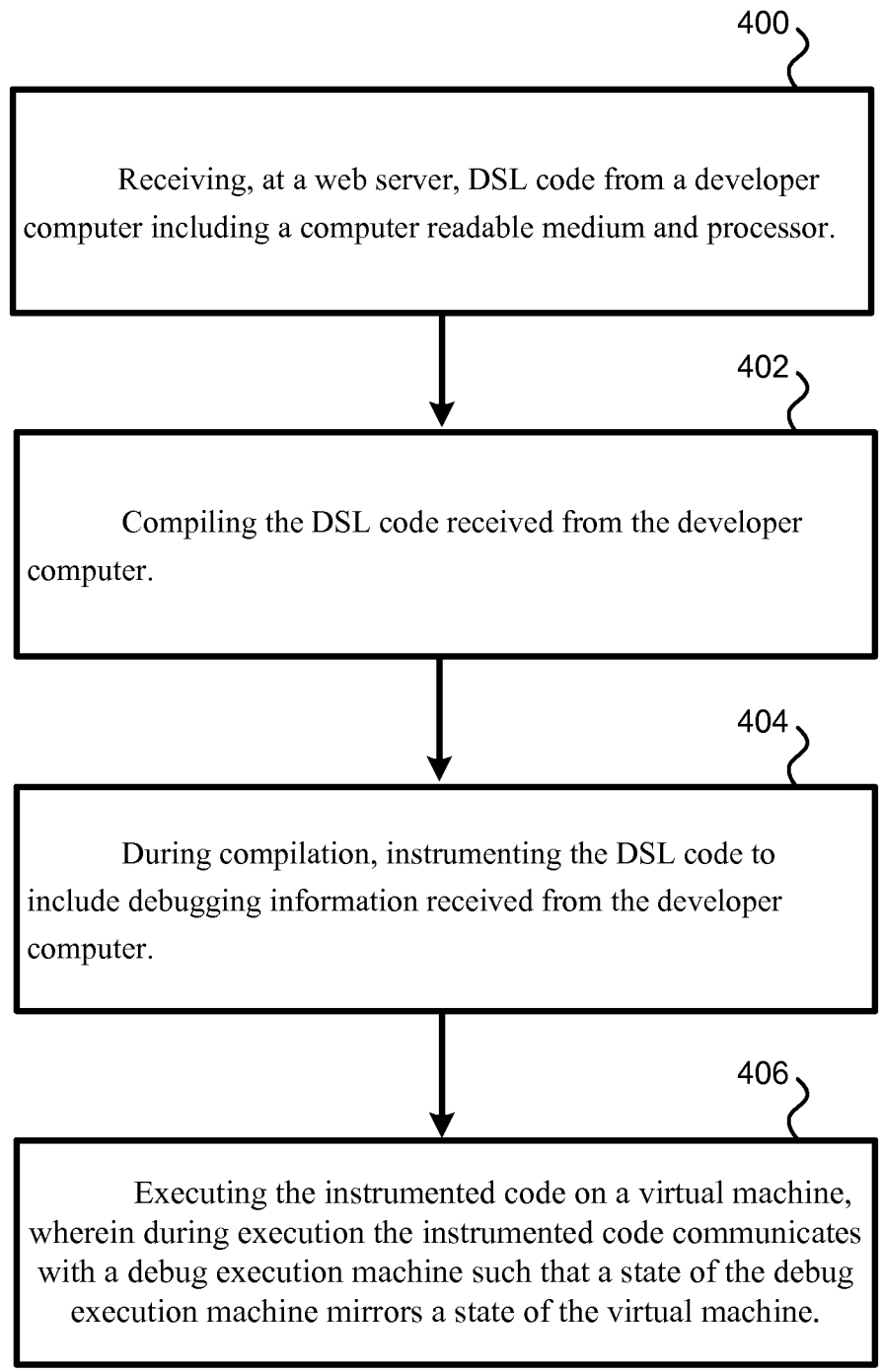
FIG. 4 shows a method of debugging using a universal debug architecture, in accordance with an embodiment of the present invention.

FIG. 4 shows a method of debugging using a universal debug architecture, in accordance with an embodiment of the present invention. At step 400, a web server can receive DSL code from a developer computer including a computer readable medium and processor. This code may be received in the form of a developer providing DSL code via a web-based interface or by providing one or more files that include uncompiled DSL code. Debugging annotations can be added to the DSL code before it is compiled. The annotations may serve as an indication to the compiler that a particular class should be called. Annotations may be added manually, by a user, or automatically, such as by the compiler. If GROOVY is used as the programming language, such annotations may be added as either global or local transformations, and may be triggered at the compilation step, which may be from the command line, or from a GROOVY API such as GroovyShell.parse( ). In some embodiments, instead of an annotation, some other triggering mechanism may be used, such as: a configuration switch, a properties file, or an environment variable.

At step 402, the DSL code is compiled. Depending on the type of DSL code, compilation can include creating a syntax tree. Each node of the syntax tree may correspond to expressions in the uncompiled DSL code. The DSL used may also permit editing of the syntax tree prior to the syntax tree being used to compile bytecode (or machine code), or other lower level executable code, depending on the DSL used. Expressions of the syntax tree may be identified by parsing the syntax tree. Further, expressions where the value of a variable may be modified may additionally be identified.

At step 404, during compilation, the DSL code can be instrumented. For example, for each expression identified, a modified expression or additional expressions may be added. Such modified or additional expressions may cause execution to be halted until input from the debug execution machine is received, modified variable values are to be output to the debug execution machine, an indication of a statement that execution has begun on should be output to the debug execution machine, and/or an indication that execution of a statement has finished should be output to the debug execution machine. Once the DSL code has been instrumented, the DSL code can finish compiling.

At step 406 the compiled instrumented code can be executed, for example on a virtual machine. During execution the instrumented code communicates with the debug execution machine such that a state of the debug execution machine mirrors a state of the virtual machine. Debugging functionality may be provided to the developer due to the modification and/or addition of expressions within the syntax tree created from the business logic code. While the instrumented code is executing, the virtual machine may be communicating with the debug execution machine for, e.g., permission to execute expressions and outputting to the debug execution machine values of variables. The debug execution machine may in turn be communicating with a debugging client (via the custom tooling interface, JDWP, and JDI) that a developer is using to access the debugging functionality.

Figure 5:
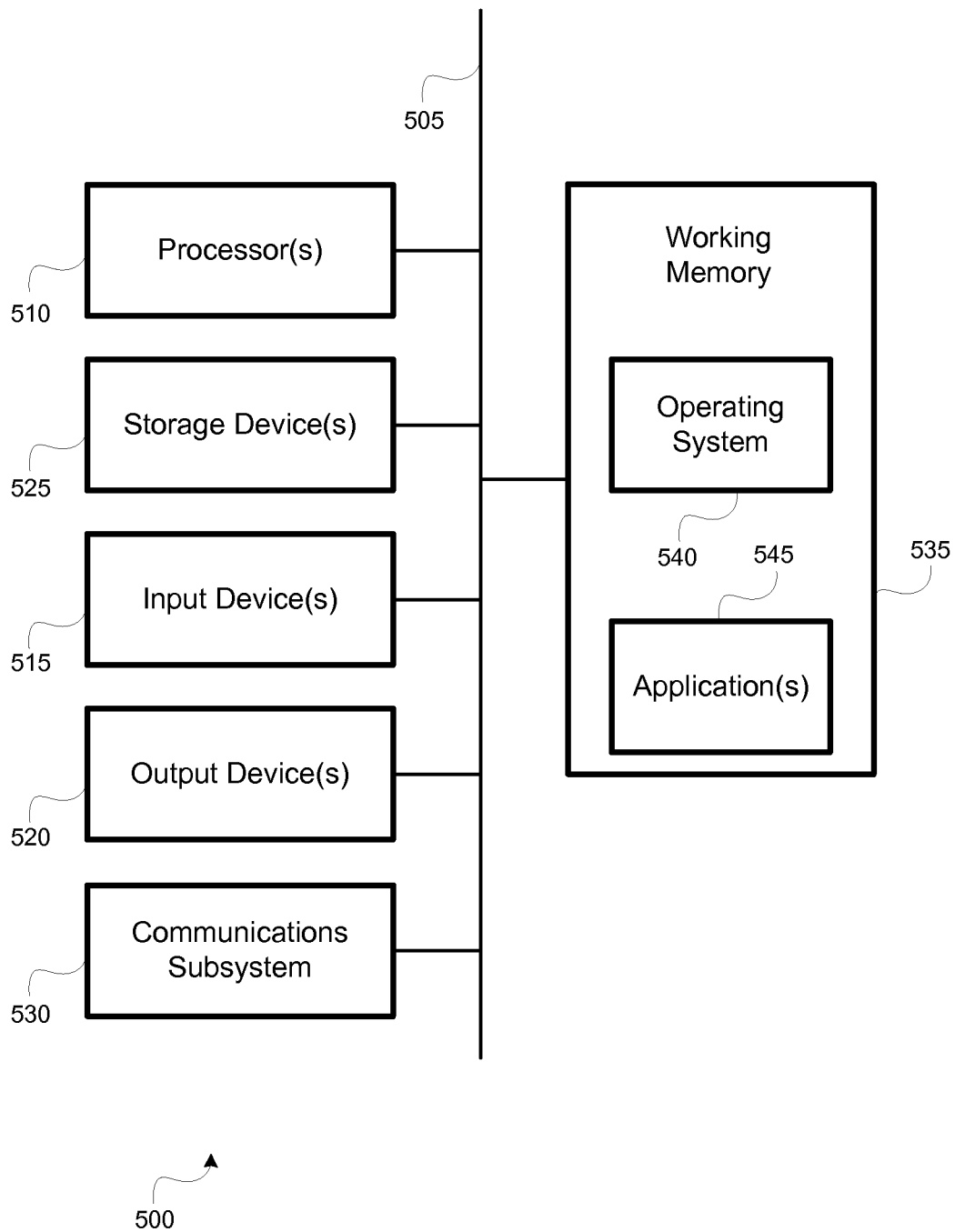
FIG. 5 illustrates an embodiment of a computer system.

FIG. 5 illustrates an embodiment of a computer system. A computer system as illustrated in FIG. 5 may be incorporated as part of the previously described computerized devices. For example, computer system 500 can represent some of the components of the webservers, the user computer system, and the developer computer systems discussed in this application. FIG. 5 provides a schematic illustration of one embodiment of a computer system 500 that can perform the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard, and/or the like; and one or more output devices 520, which can include without limitation a display device, a printer, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the non-transitory storage device(s) 525. Merely by way of example, execution of the sequences of instructions contained in the working memory 535 might cause the processor(s) 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 (and/or components thereof) generally will receive signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processor(s) 510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A system for debugging domain specific language code, comprising:
    a web server including a computer readable medium and processor, wherein the web server includes a virtual machine, a debug execution machine separate and distinct from the virtual machine, and a domain specific language (DSL)-specific tool interface, wherein the web server is configured to
        receive DSL code and debugging information from a developer computer through a web interface,
        send the DSL code and the debugging information to the debug execution machine through the DSL-specific tool interface,
        compile the DSL code received from the developer computer, wherein during compilation the DSL code is instrumented to include the debugging information received from the developer computer,
        execute, by the virtual machine, the instrumented code,
        during execution of the instrumented code by the virtual machine send state information based on the execution of the instrumented code from the virtual machine to the debug execution machine, wherein the debug execution machine includes a state machine having its own state such that a state of the debug execution machine mirrors a state of the virtual machine,
        receive, during execution, debugging instructions from the developer computer at the debug execution machine,
        based on the debugging instructions, send execution instructions from the debug execution machine to the virtual machine, and
        in response to the debugging instructions, return requested information to the developer computer through the web interface.

2. The system of claim 1, wherein the DSL-specific tool interface is implemented by the debug execution machine.

3. The system of claim 1, wherein the debug execution machine implements a listener, wherein the listener is used to establish a connection to receive debug requests from and send debug events to a debugging interface.

4. The system of claim 1, wherein the web server receives the debugging information from a debugging client at the developer computer via a debugging interface at the web server.

5. The system of claim 4, wherein the debugging interface is Java Debug Interface (JDI).

6. The system of claim 5, wherein the debugging interface communicates with the DSL-specific tool interface using Java Debug Wire Protocol (JDWP).

7. The system of claim 1, wherein the debugging instructions include one or more of an instruction to set a breakpoint, a request for a variable value and an instruction to continue execution.

8. A method for debugging domain specific language code, comprising:

receiving, at a web server, domain specific language (DSL) code and debugging information from a developer computer, including a computer readable medium and processor, through a web interface;

sending the DSL code and the debugging information to a debug execution machine through a DSL-specific tool interface;

compiling the DSL code received from the developer computer;

during compilation, instrumenting the DSL code based on the debugging information received from the developer computer;

executing the instrumented code on a virtual machine, during execution of the instrumented code by the virtual machine, sending state information based on the execution of the instrumented code from the virtual machine to a debug execution machine separate and distinct from the virtual machine, wherein the debug execution machine includes a state machine having its own state such that a state of the debug execution machine mirrors a state of the virtual machine;

receiving, during execution, debugging instructions from the developer computer at the debug execution machine;

based on the debugging instructions, sending execution instructions from the debug execution machine to the virtual machine; and in response to the debugging instructions, returning requested information to the developer computer through the web interface.

9. The method of claim 8, wherein the debug execution machine implements a listener, wherein the listener receives debug requests from and sends debug events to a debugging interface at the developer computer.

10. The method of claim 9, wherein the debug execution machine implements a DSL-specific tool interface.

11. The method of claim 8, wherein the web server receives the debugging information from a debugging client at the developer computer via a debugging interface at the web server.

12. The method of claim 11, wherein the debugging interface is Java Debug Interface (JDI).

13. The method of claim 12, wherein the debugging interface communicates with the DSL-specific tool interface using Java Debug Wire Protocol (JDWP).

14. The method of claim 8, wherein the debugging instructions include one or more of an instruction to set a breakpoint, a request for a variable value and an instruction to continue execution.

15. A non-transitory computer readable storage medium including instructions stored thereon which, when executed by a processor, cause the processor to perform the steps of:

receiving, at a web server, domain specific language (DSL) code and debugging information from a developer computer, including a computer readable medium and processor, through a web interface;

sending the DSL code and the debugging information to a debug execution machine through a DSL-specific tool interface;

compiling the DSL code received from the developer computer;

during compilation, instrumenting the DSL code based on the debugging information received from the developer computer;

executing the instrumented code on a virtual machine, during execution of the instrumented code by the virtual machine, sending state information based on the execution of the instrumented code from the virtual machine to a debug execution machine separate and distinct from the virtual machine, wherein the debug execution machine includes a state machine having its own state such that a state of the debug execution machine mirrors a state of the virtual machine;

receiving, during execution, debugging instructions from the developer computer at the debug execution machine;

based on the debugging instructions, sending execution instructions from the debug execution machine to the virtual machine; and in response to the debugging instructions, returning requested information to the developer computer through the web interface.

16. The non-transitory computer readable storage medium of claim 15, wherein the debug execution machine implements a listener, wherein the listener receives debug requests from and sends debug events to a debugging interface at the developer computer.

17. The non-transitory computer readable storage medium of claim 16, wherein the debug execution machine implements a DSL-specific tool interface.

18. The non-transitory computer readable storage medium of claim 15, wherein the web server receives the debugging information from a debugging client at the developer computer via a debugging interface at the web server.

19. The non-transitory computer readable storage medium of claim 18, wherein the debugging interface is Java Debug Interface (JDI), and wherein the debugging interface communicates with the DSL-specific tool interface using Java Debug Wire Protocol (JDWP).

20. The non-transitory computer readable storage medium of claim 15, wherein the debugging instructions include one or more of an instruction to set a breakpoint, a request for a variable value and an instruction to continue execution.

21. The system of claim 1, wherein the execution of the instrumented code by the virtual machine initiates one or more state transitions in the debug execution machine such that the state of the debug execution machine mirrors the state of the virtual machine.

* * * * *

UNITED STATES PATENT AND TRADEMARK OFFICE
CERTIFICATE OF CORRECTION

PATENT NO. : 9,122,794 B2
APPLICATION NO. : 13/664106
DATED : September 1, 2015
INVENTOR(S) : Smiljanic et al.

Page 1 of 1

It is certified that error appears in the above-identified patent and that said Letters Patent is hereby corrected as shown below:

Claims

In column 11, line 15, in claim 8, delete "machine," and insert -- machine; --, therefor.

In column 12, line 11, in claim 15, delete "machine," and insert -- machine; --, therefor.

Signed and Sealed this
Twenty-first Day of June, 2016

Michelle K. Lee
*Director of the United States Patent and Trademark Office*